Patented May 8, 1951

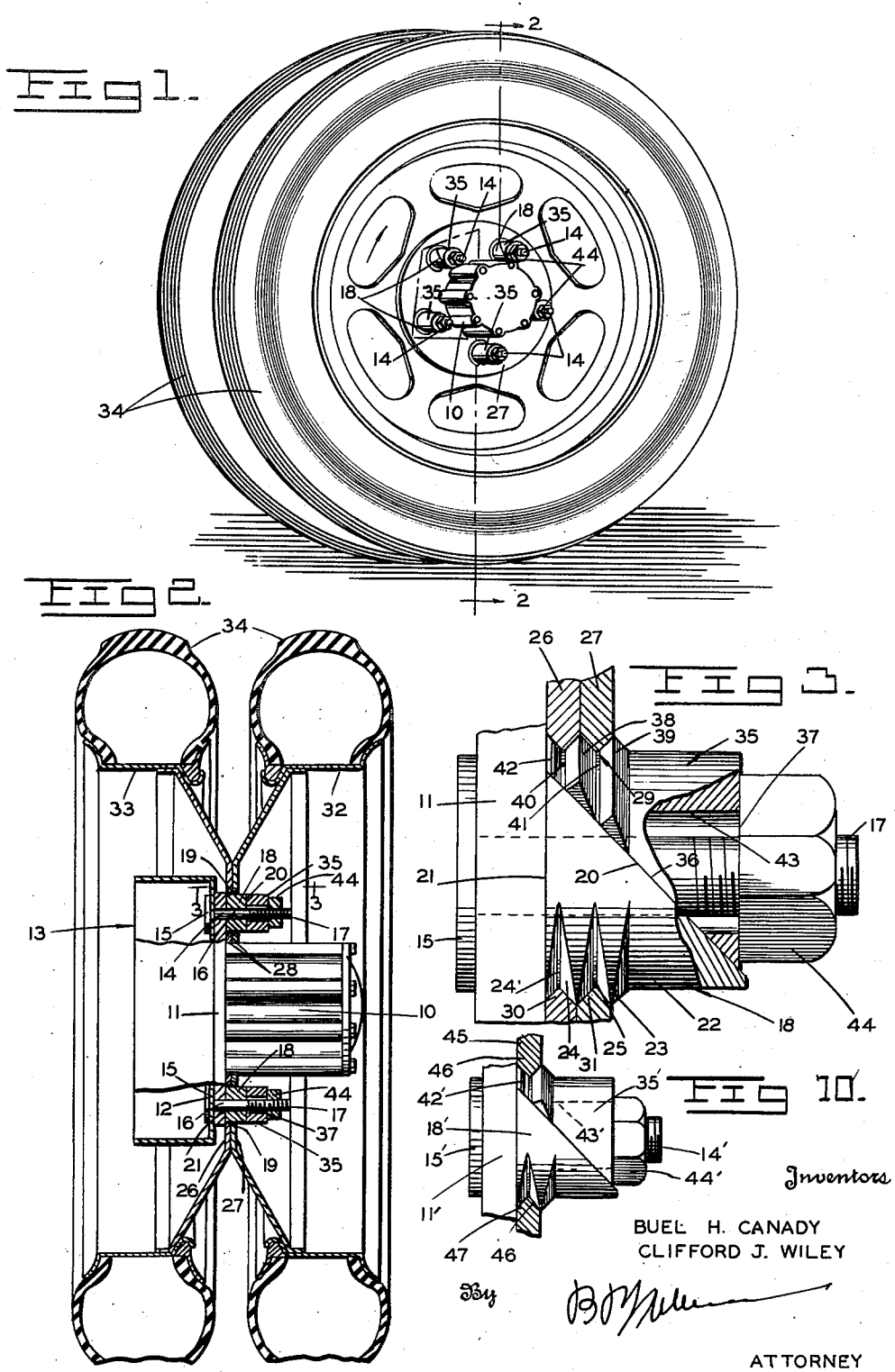

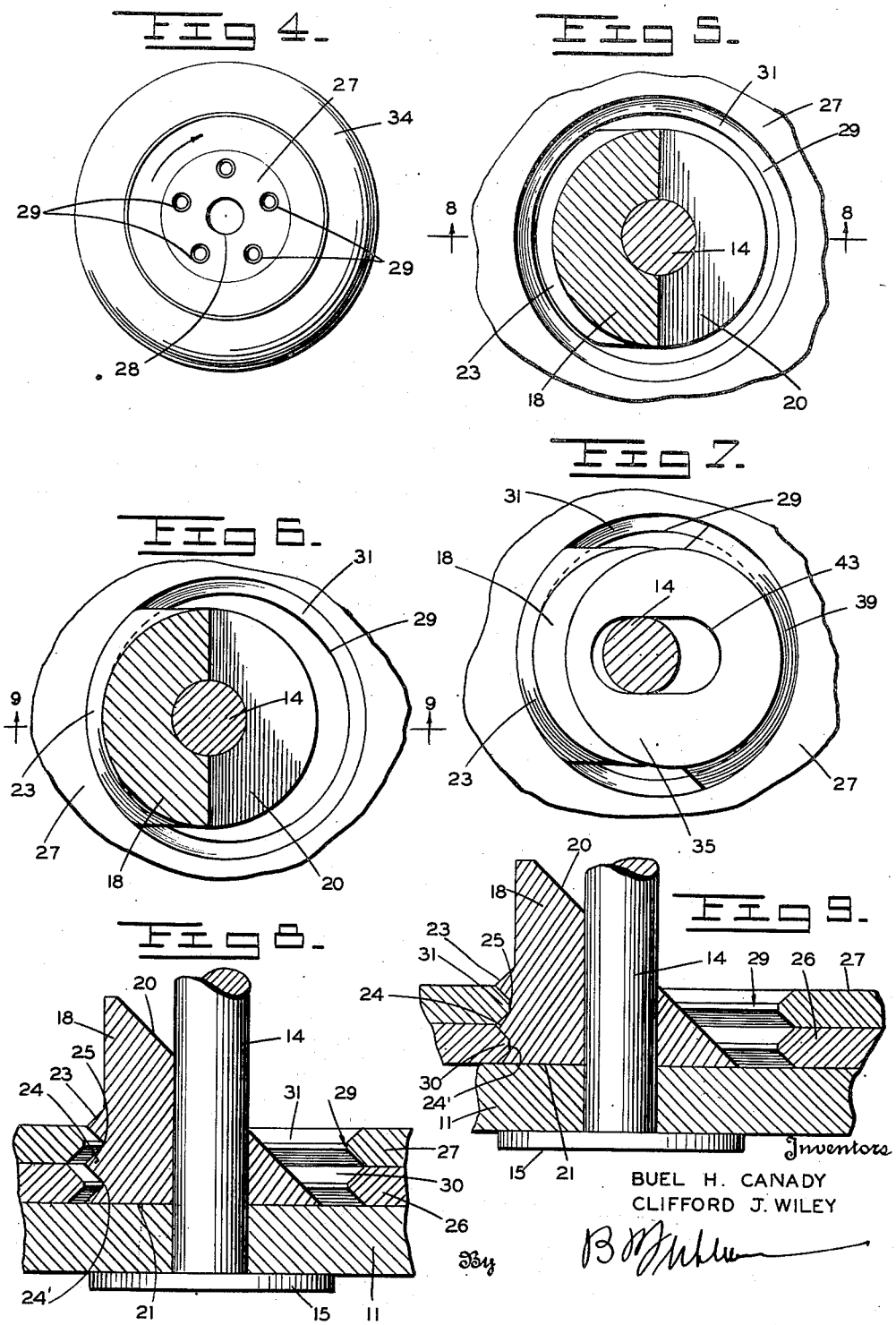

2,552,034

UNITED STATES PATENT OFFICE 2,552,034

DEMOUNTABLE WHEEL FOR AUTOMOTIVE VEHICLES

Buel H. Canady, Huntington Park, Calif., and Clifford J. Wiley, Winslow, Ariz.

Application November 23, 1948, Serial No. 61,666

11 Claims. (Cl. 301—9)

Our invention relates to improvements in demountable wheels for automotive vehicles.

A primary object of our invention is to provide a demountable wheel for automotive vehicles, having novel means for mounting and locking the wheel upon the studs of the hub.

A further object is to provide automotive wheel mounting and locking means which are well adapted for use with conventional automobile wheels and dual wheels of trucks, busses and the like.

A further object is to provide means for mounting and locking wheels upon the studs of the wheel hub, wherein a wedging action is employed to produce the locking.

A further object is to provide a demountable wheel of the above mentioned type, wherein the locking action will increase when driving action of the wheel occurs.

A still further object of the invention is to provide a device of the above mentioned character which is simplified, easy to manipulate, and relatively inexpensive to manufacture.

Other objects and advantages of the invention will be apparent during the course of the following description.

In the accompanying drawings, forming a part of this application, and in which like numerals are employed to designate like parts throughout the same, Figure 1 is a perspective view of a demountable dual wheel embodying our invention, Figure 2 is a generally radial section taken upon line 2—2 of Figure 1, Figure 3 is an enlarged fragmentary horizontal section taken upon line 3—3 of Figure 2, Figure 4 is a side elevation of a wheel removed from its hub, Figure 5 is an enlarged fragmentary view, partly in section, and showing the relative positions of the wheel and fixed lugs when the wheel is first applied to the hub, Figure 6 is a similar view showing the relative positions of the wheel and fixed lugs after the wheel has been applied to the hub and turned manually, Figure 7 is a similar view showing the relative positions of the wheel, fixed lugs, and detachable lugs, Figure 8 is a horizontal section taken on line 8—8 of Figure 5, Figure 9 is a horizontal section taken on line 9—9 of Figure 6, and, Figure 10 is a view similar to Figure 3, wherein a modified form of the invention is illustrated.

In the drawings, where for the purpose of illustration are shown preferred embodiments of our invention, attention is directed first to Figures 1 to 9 inclusive, wherein the numeral 10 designates the hub of a dual automotive wheel of a conventional type, such as generally employed on heavy trucks, busses and the like. The hub 10 is adapted to receive within it a suitable roller bearing and grease retainer, not shown, the bearing and grease retainer within the hub receiving the outer tapered end of the vehicle axle, not shown. The hub 10 is provided at its inner end with an annular radially extending flange 11 having an inner flat face for abutment against the outer flat end 12 of a brake drum 13. The brake drum 13 is rigidly secured to flange 11 by a plurality of axially extending studs 14 having heads 15 arranged inwardly of the end 12 of the brake drum as shown. The heads 15 may be riveted or clinched against the end 12 of the brake drum for making the brake drum fast to the flange 11. The studs 14 are of course rigidly secured within openings provided for them in the flange 11 of the hub. All of this construction is conventional in automotive wheels. The studs 14 extend axially outwardly of the annular flange 11, and are provided outwardly thereof with smooth cylindrical shank portions 16, and outwardly of the shank portions 16 the studs 14 are screw threaded, as at 17, in the usual manner.

Rigidly mounted upon each stud 14 is an inner fixed lug 18 having a central axial bore 19 to receive the smooth shank portion 16, which is tightly pressed into the bore 19. Each lug 18 is generally cylindrical, and has its outer end 20 beveled or inclined at 45 degrees to the axis of its bore 19, as shown. The lugs 18 are mounted upon the studs in such a manner that the inclined ends 20 of the lugs 18 face in the same circumferential direction, Figure 1. The inclined ends 20 face forwardly or lead, when the wheel illustrated in Figure 1 is turned clockwise. The studs 18 have inner flat circular ends 21 which abut against the outer face of annular flange 11, and the cylindrical sides 22 of the studs 18 are perpendicular to the flange 11. Each lug 18 is provided upon its cylindrical side 22, and diametrically opposite the inclined end 20, with a pair of axially spaced V-shaped ribs or teeth 23 and 24. The teeth 23 and 24 extend about substantially one-half the circumference of the lug 18, Figures 3 and 5, and form inner and outer circumferentially extending V-shaped grooves 24' and 25. The inner groove 24' is disposed adjacent to the inner end 21, and in assembly, the inner groove 24' lies next to the outer face of the flange 11, Figure 3.

The numerals 26 and 27 designate inner and outer discs of the dual wheel to be mounted upon the studs 14 having the fixed lugs 18. The discs 26 and 27 are preferably arranged in contacting relation, as shown, and are rigidly secured together by any conventional means. The discs 26 and 27 have registering central openings 28 to receive the hub 10, and are provided with circumferentially spaced registering openings 29, outwardly of the openings 28 for receiving the studs 14 and fixed lugs 18. The openings 29 of the discs 26 and 27 are countersunk on both sides of the discs, for providing annular V-shaped edges or teeth 30 and 31 to engage within the V-shaped grooves 24' and 25 of the lugs 18. As is clearly shown by Figures 5 and 8, the opening 29 defined by the inner edges of the annular teeth 30 and 31 is of greater diameter than the width of the fixed lug 18 and its teeth 23 and 24, so that when the wheel is applied to the hub the openings 29 may engage over the fixed lugs 18. The discs 26 and 27 extend radially outwardly of the brake drum 13 and carry rims 32 and 33, upon which are mounted pneumatic tires 34.

Companion detachable locking lugs 35 are provided for each stud 14. Each detachable locking lug 35 is generally cylindrical and has its inner end 36 beveled or inclined at 45 degrees to the axis of the stud 14. The outer end 37 of each detachable locking lug 35 is flat and perpendicular to the axis of its associated stud. Each stud 35 is provided upon its cylindrical side and diametrically opposite its inclined end 36 with a pair of axially spaced V-shaped ribs or teeth 38 and 39, forming inner and outer circumferentially extending V-shaped grooves 40 and 41 to receive the annular V-shaped teeth 30 and 31 of discs 26 and 27. In assembly, the V-shaped teeth 38 and 39 of the detachable lugs 35 are disposed diametrically opposite the V-shaped teeth 23 and 24 of the fixed lugs 18, Figure 3. The inclined ends 20 and 36 contact in assembly, and it should be noted that the inclined ends 20 and 36 are parallel to the inner sides of the V-shaped teeth 30 and 31 of discs 26 and 27. The detachable locking lugs 35 are axially shorter than the fixed lugs 18, so that the inner ends 42 of the detachable lugs are spaced slightly from the flange 11 in assembly, and the outer ends 37 are below the outer ends of the fixed lugs 18, Figure 3. Each detachable locking lug 35 is provided with a central elongated opening or slot 43 of sufficient width to receive the outer end of a stud 14, and extending axially through the locking lug 35. The openings or slots 43 permit the detachable locking lugs 35 to be shifted laterally with respect to the studs 14 so that the inner ends 36 of the detachable lugs may slide along the outer ends 20 of the fixed lugs 18. As shown in Figures 3 and 7, the longitudinal axes of the slots 43 pass through points at the longitudinal centers of the diametrically oppositely arranged V-shaped teeth 23, 24, and 30, 31. Each stud 14 is provided axially outwardly of its associated detachable locking lug 35 with a nut 44, mounted upon the screw threaded portion 17.

In use, the openings 29 of discs 26 and 27 are brought into registration with studs 14 and the fixed lugs 18 carried thereby, and the openings 29 receive the fixed lugs 18 within them as shown in Figure 5. The wheel is now turned manually in the clockwise direction, Figure 1, so that the annular V-shaped teeth 30 and 31 of the discs will be shifted into the circumferentially extending V-shaped grooves 24' and 25 of the fixed lugs 18. This condition is clearly shown in Figures 6 and 9 of the drawings. The detachable locking lugs 35 are now applied to the studs 14 and the inner ends 36 are brought into sliding contact with the outer ends 20 of the fixed lugs. The elongated slots 43 of the detachable lugs permit the detachable lugs to slide along the outer ends 20 and to shift laterally in one direction only with respect to the studs 14. Since the ends 20 and 36 are parallel to the inner sides of the annular V-shaped teeth 30 and 31 of the discs, the teeth 30 and 31 will enter the circumferentially extending V-shaped grooves 40 and 41 of the lugs 35, as they are shifted inwardly along the inclined ends 20. This arrangement is clearly shown in Figures 3 and 7. Since the lugs 18 are fixed and the inclined flat ends 20 and 36 are in contact, it is impossible for the detachable lugs 35 to rotate. When all of the lugs 35 are in their positions of Figures 3 and 7, the nuts 44 are tightened and the detachable lugs 35 are forced further inwardly. When this occurs, as is obvious, a wedging and spreading action between the fixed lugs and detachable locking lugs will occur. The annular V-shaped teeth 30 and 31 of the discs 26 and 27 will be driven into the V-shaped grooves at the opposite sides of the fixed and detachable lugs so that the discs become securely locked to the lugs and to the studs 14. The discs 26 and 27 will now have no play or movement in any direction, and when power is applied to the wheel the locking action produced by the lugs is further increased, rather than decreased.

In Figure 10, we have shown a slight modification of the invention, wherein a conventional automobile wheel having a single radially extending web or disc 45 is shown. The automobile wheel of Figure 10 includes a radial hub flange 11', identical with the flange 11, and studs 14' identical with the studs 14. Nuts 44' identical with the nuts 44 are provided for producing the same wedging and spreading action. Fixed lugs 18' are rigidly mounted upon the studs 14' in the identical manner that the fixed lugs 18 are mounted. Detachable locking lugs 35' having elongated slots 43' are mounted upon the studs 14', and co-act with the fixed lugs 18' in the identical manner in which the lugs 35 co-act with the fixed lugs 18. The only difference in the form of the invention shown in Figure 10 is that each of the lugs 18' and 35' is provided with but a single circumferentially extending V-shaped groove 46, for receiving a single V-shaped annular tooth 47 formed by the countersinking of the opposite sides of the single disc 45, adjacent to the openings provided in such disc for the reception of the lugs 18' and 35'. All other parts of the invention illustrated in Figure 10 are identical to those shown and described in the first form of the invention.

It is clearly evident in the forms of the invention shown in Figures 1 to 9 inclusive, and in Figure 10, that the mounting and locking of the discs 26 and 27 upon the studs of the hub are accomplished by the action of the fixed and detachable lugs which constitute fixed and movable wedges respectively. These fixed and movable wedges have the V-shaped teeth, as stated, which constitute parts to interfit with the annular V-shaped teeth of the discs.

It is to be understood that the forms of the invention herewith shown and described are to be taken as preferred examples of the same, and that various changes in the shape, size, and arrangement of parts may be resorted to, without departing from the spirit of the invention or the scope of the subjoined claims.

Having thus described our invention, we claim:

1. A vehicle wheel, comprising a hub member, a disc arranged adjacent to the hub member and having lug receiving openings, fixed lugs secured to the hub member and extending into the lug receiving openings, detachable lugs for co-action with the fixed lugs and extending into the lug receiving openings, the fixed and detachable lugs having contacting inclined faces, and means engaging the detachable lugs for shifting the same along the inclined faces of the fixed lugs to effect a relative spreading movement between the fixed and detachable lugs within the lug receiving openings.

2. A vehicle wheel, comprising a hub member, studs secured to the hub and extending axially thereof, a disc disposed near the hub member and having a plurality of stud receiving openings, fixed lugs mounted upon the studs and having outer beveled faces, detachable lugs for the studs and having inner beveled faces for sliding contact with the outer beveled faces of the fixed lugs and being provided with elongated openings to receive the studs, the fixed and detachable lugs having portions extending into the stud receiving openings, and nuts mounted upon the studs and contacting the detachable lugs for shifting the same along the beveled faces of the fixed lugs to effect a relative spreading movement between the fixed and detachable lugs within the lug receiving openings.

3. A vehicle wheel, comprising a hub member, studs secured to the hub member and extending axially thereof, a disc disposed near the hub member and having a group of stud receiving openings, a lug for each stud and having an outer beveled face and an axial opening to receive the stud and passing through the beveled face, a detachable lug for each stud and having an inner beveled face to contact the outer beveled face and having an elongated axially extending opening to receive the stud and passing through the inner beveled face, the lugs being arranged within the stud receiving openings and the disc and lugs having interfitting parts, and a nut carried by each stud to engage the removable lug.

4. A vehicle wheel, comprising a hub member, a disc disposed near the hub member and having lug receiving openings, fixed lugs secured to the hub and extending into the lug receiving openings, detachable lugs for co-action with the fixed lugs and extending into the lug receiving openings, said disc and said lugs having interfitting parts, the fixed and detachable lugs having contacting inclined faces, and means engaging the detachable lugs for shifting the same along the inclined faces of the fixed lugs to effect a relative spreading movement between the fixed and detachable lugs within the lug receiving openings.

5. A vehicle wheel, comprising a hub member, studs secured to the hub member and extending axially thereof, a disc disposed near the hub member and having a plurality of stud receiving openings, the disc being provided with a tooth extending into each stud receiving opening, fixed lugs mounted upon the studs and having outer beveled faces, the fixed lugs extending into the stud receiving openings and having teeth to interfit with the teeth of the disc, detachable lugs for the studs and having inner beveled faces to contact the outer beveled faces of the fixed lugs and being provided with elongated openings to receive the studs, the detachable lugs having teeth to interfit with the teeth of the disc and extending into the stud receiving openings, and nuts mounted upon the studs outwardly of the detachable lugs for shifting the same along the beveled faces of the fixed lugs to effect a relative spreading movement between the fixed and detachable lugs within the lug receiving openings.

6. A vehicle wheel, comprising a hub member, studs secured to the hub member and extending axially thereof, a disc disposed near the hub member and having a plurality of stud receiving openings, the disc being provided with teeth extending into the stud receiving openings, lugs mounted upon the studs and having outer beveled faces, the lugs extending into the stud receiving openings and having teeth to interfit with the teeth of the disc at one side of each stud receiving opening, detachable lugs for the studs and having inner beveled faces for sliding contact with the outer beveled faces of the first named lugs and provided with elongated openings to receive the studs, the detachable lugs extending into the stud receiving openings and having teeth to interfit with the teeth of the disc at the sides of the stud receiving openings remote from the teeth of the first named lugs, and nuts mounted upon the studs outwardly of the detachable lugs and turnable for shifting the detachable lugs upon the fixed lugs to produce a wedging action between the first named and detachable lugs.

7. A vehicle wheel, comprising a hub member, studs secured to the hub member and extending axially thereof, a disc disposed near the hub member and having a plurality of stud receiving openings, the disc being provided with teeth extending into the stud receiving openings and having inclined sides, fixed lugs mounted upon the studs and having outer inclined faces parallel to the inclined sides of the teeth, the fixed lugs extending into the stud receiving openings and having teeth including inclined sides parallel to the inclined faces of the fixed lugs, the teeth of the fixed lugs interfitting with the teeth of the disc at one side of each stud receiving opening, detachable lugs for the studs and having inner inclined faces parallel to the outer inclined faces of the fixed lugs and adapted to contact the outer inclined faces of the fixed lugs, the detachable lugs being provided with elongated openings to receive the studs, the detachable lugs extending into the stud receiving openings and having teeth including inclined sides parallel to the inclined faces of the fixed and detachable lugs, the teeth of the detachable lugs interfitting with the teeth of the disc at the sides of the stud receiving openings opposite from the teeth of the fixed lugs, and nuts mounted upon the studs outwardly of the detachable lugs for shifting the detachable lugs parallel to the inclined faces of the same.

8. A vehicle wheel, comprising a hub member, studs secured to the hub member and extending axially thereof, a disc disposed near the hub member and having a plurality of stud receiving openings, the disc being provided with annular teeth extending into the stud receiving openings, fixed lugs mounted upon the studs and having outer beveled faces, the fixed lugs extending into the stud receiving openings and having circumferentially extending teeth to interfit with the annular teeth of the disc at one side of each stud receiving opening, detachable lugs for the studs and having inner beveled faces to contact the outer beveled faces of the fixed lugs and provided with elongated openings to receive the studs, the detachable lugs extending into the stud receiving openings and having circumferentially extending teeth to interfit with the annular teeth of the disc at the sides of the stud receiving openings opposite the teeth of the fixed lugs, and nuts mounted upon the studs outwardly of the detachable lugs for shifting the detachable lugs inwardly to force the circumferentially extending teeth of the fixed and detachable lugs into interfitting engagement with the annular teeth of the disc.

9. A vehicle wheel, comprising a hub, studs secured to the hub and extending axially thereof, companion connected discs having a main opening to receive the hub and a plurality of stud receiving openings surrounding the main opening, the discs being provided with teeth extending into the stud receiving openings, fixed lugs mounted upon the studs and having outer beveled faces, the fixed lugs extending into the stud receiving openings of the discs and having teeth to interfit with the teeth of the discs at one side of each stud receiving opening, detachable lugs for the studs and having inner beveled faces for sliding contact with the outer beveled faces of the fixed lugs and provided with elongated openings to receive the studs, the detachable lugs extending into the stud receiving openings and having teeth to interfit with the teeth of the discs at the sides of the stud receiving openings opposite the teeth of the fixed lugs, and nuts mounted upon the studs outwardly of the detachable lugs and turnable for shifting the detachable lugs inwardly and laterally with respect to the studs to produce a spreading action within the stud receiving openings.

10. A vehicle wheel, comprising a hub member, a disc arranged near the hub member and having lug receiving openings, first lugs secured to the hub member and extending into the lug receiving openings, second lugs for co-action with the first lugs and extending into the lug receiving openings, the first and second lugs having contacting inclined faces, and means engaging the second lugs for shifting the same along the inclined faces of the first lugs to effect a relative radial spreading movement between the first and second lugs within the lug receiving openings.

11. A vehicle wheel, comprising a hub member, a disc arranged near the hub member and having lug receiving openings, radially adjustable lugs mounted within the lug receiving openings and shiftable into and out of engagement with the walls of such openings, said lugs having inclined faces, lugs arranged within the lug receiving openings to engage with the walls of such openings and having parts to contact with the inclined faces of the radially adjustable lugs, and means connecting the radially adjustable lugs and the last named lugs with the wheel member, the last named means being adjustable to move the radially adjustable lugs axially.

BUEL H. CANADY.
CLIFFORD J. WILEY.

REFERENCES CITED

The following references are of record in the file of this patent:

UNITED STATES PATENTS

| Number | Name | Date |
|---|---|---|
| 2,336,767 | Ash | Dec. 14, 1943 |